United States Patent
Reime

(10) Patent No.: US 10,229,351 B2
(45) Date of Patent: Mar. 12, 2019

(54) IDENTIFICATION ELEMENT HAVING AN OPTICAL TRANSPONDER

(76) Inventor: Gerd Reime, Buehl (DE)

( * ) Notice: Subject to any disclaimer, the term of this patent is extended or adjusted under 35 U.S.C. 154(b) by 860 days.

(21) Appl. No.: 13/061,664

(22) PCT Filed: Aug. 24, 2009

(86) PCT No.: PCT/EP2009/006124
§ 371 (c)(1),
(2), (4) Date: Mar. 1, 2011

(87) PCT Pub. No.: WO2010/022906
PCT Pub. Date: Mar. 4, 2010

(65) Prior Publication Data
US 2011/0163844 A1    Jul. 7, 2011

(30) Foreign Application Priority Data

Sep. 1, 2008 (DE) .......... 10 2008 045 142
Oct. 13, 2008 (DE) .......... 10 2008 050 988

(51) Int. Cl.
G05B 19/00    (2006.01)
G05B 23/00    (2006.01)
(Continued)

(52) U.S. Cl.
CPC ..... G06K 19/0728 (2013.01); G06K 19/0723 (2013.01); G07C 9/00007 (2013.01);
(Continued)

(58) Field of Classification Search
CPC  H04B 14/026; H04B 10/116; H05B 33/0869; G01S 7/282; G06K 7/10306; G06K 19/0701
(Continued)

(56) References Cited

U.S. PATENT DOCUMENTS 4,072,943 A * 2/1978 Miller .......... G01S 13/70
342/30
4,189,712 A * 2/1980 Lemelson .......... 340/5.62
(Continued)

FOREIGN PATENT DOCUMENTS

DE   10 2005 062 632 A1   6/2007
EP          1107161 A2    6/2001
(Continued)

OTHER PUBLICATIONS

International Search Report PCT/EP2009/006124; dated Jun. 23, 2010.

*Primary Examiner* — Quang Pham
(74) *Attorney, Agent, or Firm* — Cantor Colburn LLP

(57) ABSTRACT

An identification element has a transponder with a data-emitting transmission unit and with a data-receiving reception unit in order to communicate with a device for registering and/or controlling access authorization to spaces or objects. In addition, a control circuit is provided for the transmission unit and reception unit. The transponder is an optical transponder (1.1), the transmission unit of which is a light-emitting transmission unit (1.3) and the reception unit of which is a light-receiving reception unit (1.4). The optical transponder and an autonomous power supply are integrated into the identification element. The identification element is in the shape of a name plate or of an identification element of comparable size which is assigned to an object or body or is to be supported thereon. By virtue of the fact that the transmission unit (1.3) of the optical transponder (1.1) is operated by the control circuit (2.5) in such a way that it transmits optical pulses of less than or equal to 100 nanoseconds repeatedly per second and that the identification element is batteryless, a very small optical transponder is provided which requires little energy and no batteries.

12 Claims, 4 Drawing Sheets

(51) Int. Cl.
*G06F 7/00* (2006.01)
*G06F 7/04* (2006.01)
*G08B 29/00* (2006.01)
*G08B 19/00* (2006.01)
*H04B 1/00* (2006.01)
*H04B 3/00* (2006.01)
*H04Q 1/00* (2006.01)
*H04Q 9/00* (2006.01)
*G06K 19/07* (2006.01)
*G07C 9/00* (2006.01)
*H04B 10/114* (2013.01)

(52) U.S. Cl.
CPC ..... *H04B 10/1143* (2013.01); *G07C 9/00309* (2013.01); *G07C 2009/00785* (2013.01)

(58) Field of Classification Search
USPC .................. 340/10.1–10.6, 539.22; 398/140
See application file for complete search history.

(56) References Cited

U.S. PATENT DOCUMENTS

| | | | | |
|---|---|---|---|---|
| 4,918,689 | A * | 4/1990 | Hui | H04J 3/26 370/510 |
| 5,216,622 | A * | 6/1993 | Kibblewhite | G01L 5/246 700/275 |
| 5,241,161 | A * | 8/1993 | Zuta | 235/382 |
| 5,377,225 | A * | 12/1994 | Davis | H04B 1/71 370/342 |
| 5,557,280 | A * | 9/1996 | Marsh | G01S 13/78 342/44 |
| 5,611,346 | A * | 3/1997 | Heikkila | A61B 5/0006 128/903 |
| 5,633,742 | A | 5/1997 | Shipley | |
| 5,860,015 | A * | 1/1999 | Olson | 713/300 |
| 5,889,583 | A * | 3/1999 | Dunne | 356/5.01 |
| 6,118,567 | A * | 9/2000 | Alameh | H04L 27/06 375/350 |
| 6,353,776 | B1 * | 3/2002 | Rohrl et al. | 340/426.16 |
| 6,611,556 | B1 * | 8/2003 | Koerner | G06K 7/0008 340/10.52 |
| 6,812,884 | B2 * | 11/2004 | Richley et al. | 342/125 |
| 7,176,948 | B2 * | 2/2007 | Lewis | 345/691 |
| 7,292,628 | B2 * | 11/2007 | Koerner | G06K 7/0008 375/224 |
| 7,893,816 | B1 * | 2/2011 | Kwan | 340/10.34 |
| 9,436,899 | B2 * | 9/2016 | Haar | G06K 7/0008 |
| 2001/0033629 | A1 * | 10/2001 | Ito | G11B 20/10 375/368 |
| 2001/0049791 | A1 * | 12/2001 | Gascher | G01S 13/765 713/185 |
| 2002/0003816 | A1 * | 1/2002 | Nabesako | H04N 21/426 370/542 |
| 2003/0030386 | A1 * | 2/2003 | Leeb et al. | 315/291 |
| 2003/0195969 | A1 * | 10/2003 | Neuman | H04L 12/2803 709/229 |
| 2003/0200227 | A1 * | 10/2003 | Ressler | 707/104.1 |
| 2004/0166911 | A1 * | 8/2004 | Chen | H04L 25/4902 455/701 |
| 2005/0040241 | A1 | 2/2005 | Raskar | |
| 2005/0134502 | A1 * | 6/2005 | Ikeda | G01S 7/023 342/159 |
| 2005/0258939 | A1 | 11/2005 | Kantrowitz | |
| 2006/0220857 | A1 * | 10/2006 | August et al. | 340/572.1 |
| 2006/0256070 | A1 | 11/2006 | Moosavi | |
| 2006/0279438 | A1 * | 12/2006 | Kishi | H03M 5/08 341/51 |
| 2007/0035381 | A1 | 2/2007 | Davis | |
| 2007/0110126 | A1 * | 5/2007 | Sekiguchi | H04B 1/71632 375/130 |
| 2007/0132592 | A1 * | 6/2007 | Stewart et al. | 340/572.8 |
| 2007/0232592 | A1 | 10/2007 | Delavault | |
| 2007/0236384 | A1 * | 10/2007 | Ivtsenkov et al. | 342/45 |
| 2008/0204322 | A1 * | 8/2008 | Oswald | G01S 5/04 342/465 |
| 2008/0218351 | A1 * | 9/2008 | Corrado | G06K 19/0705 340/572.4 |
| 2009/0097065 | A1 * | 4/2009 | Takeyama | H04N 1/00002 358/1.15 |
| 2009/0112197 | A1 * | 4/2009 | Hyde et al. | 606/14 |
| 2009/0214225 | A1 * | 8/2009 | Nakagawa et al. | 398/191 |
| 2010/0159842 | A1 * | 6/2010 | Fukagawa | G01S 5/0226 455/67.11 |

FOREIGN PATENT DOCUMENTS

| | | | |
|---|---|---|---|
| EP | 1229672 | * 7/2002 | ............ H04B 10/10 |
| EP | 1229672 B1 | 8/2002 | |
| EP | 1804220 A1 | 7/2007 | |
| WO | 03019502 A1 | 3/2003 | |

* cited by examiner

IDENTIFICATION ELEMENT HAVING AN OPTICAL TRANSPONDER

CROSS REFERENCE TO RELATED APPLICATIONS

The present application claims the priority of the German patent applications 10 2008 045 142.8, filed on 1 Sep. 2008, and also 10 2008 050 988.4, filed on 13 Oct. 2008, the published contents of which are hereby expressly incorporated by reference into the subject matter of the present application.

TECHNICAL FIELD

The invention relates to an identification element incorporating a transponder and also to a method for recognizing an identification element.

BACKGROUND

Inductively working transponders have been known for a long time. They are employed in many cases as access control means e.g. on security doors. A so-called card reader is located in front of the door.

In order to enter the secured area, the user has to hold a small authorizing element, often in the shape of a cheque card, close to the card reader. Inductive power can be fed into the card due to its close proximity. Thereupon, the card itself inductively conveys a digital data word back to the card reader for identification purposes. The card reader compares the data word with data stored therein and operates the door opening system if there is an appropriate confirmation. In similar systems, the current data word on the card can also be changed e.g. modified by the card reader. One disadvantage of these systems is that the card has to be placed directly on the reader every time in order to e.g. open a door. This entails stopping one's progress, getting out the authorization card and holding the card in front of the card reader until the card reading device has released e.g. the entrance. Afterwards, the card has to be put back properly into its starting position, e.g. into a trouser pocket.

Transponders utilising radio transmission techniques would guarantee a greater range, but since it is difficult to direct radio waves and, on the other hand, they can also pass through walls and ceilings, the use of a radio transponder is not secure.

Moreover, the door would then be regularly opened quite unintentionally by authorized persons who are e.g. merely passing the door.

There is often a desire in hospitals for example, for one to be able to simply go towards a door which then opens with appropriate authorization whilst one is some distance away. If the transponder is accommodated in the frequently worn name tag of a person having authorized access, he will be able to push an e.g. patient's bed in front of himself and the door through which he has to go will open whilst he is still e.g. 5 m away. Consequently, his passage will not be interfered with and time can thereby be saved. In this situation, the ability to precisely direct optical beams of light has substantial advantages: only an authorized person going towards the door will activate it even from quite far away, whilst persons having the same access authorization but who are just passing by in the direct vicinity of the door will not activate it. The fixed device for the functioning of the transponder system can also be weather-protected behind a protective glass cover (a double glass sheet with a gap therebetween). A substantial time advantage also results in the case of persons who, for occupational reasons, must pass quickly through doors without having to take out their access authorization and stop at the reading device. This is often desired at airports since, there in particular, attention has to be paid to time-saving working patterns.

A further advantage results when using an optical transponder in the case of secured parking lots. The optical transponder can be mounted inside the vehicle behind the windscreen so that, when driving past an appropriate reader and upon its access authorization being recognized, the vehicle barrier is operated and the vehicle let in. Here, there is no need to decelerate and stop, hold out the authorization card to the reader and then drive off again.

Optical systems for access control purposes are of course known in the trade, they generally need manual release of a switch for activation purposes. Systems operating without manual activation have not been able to enter the market so far because of their size or the weight of the necessary batteries and the associated operating costs.

Transmitter units for optical signals in the infrared range are generally known. Remote controls, in particular for TV and the like, usually work with coded infrared light. These transmitter units are activated by depressing a key and they then send out coded light pulses i.e. their data word, for the short time interval during which the key is depressed or for a pre-determined time. As a rule, a binary data word consists of the pulses 0 and 1, wherein a 0 is usually a short pulse and a 1 is a long pulse or two successive pulses. In order to obtain a greater range, an appropriately high current is sent through the transmission elements for a short time, these elements usually being light emitting diodes. The pulse length usually amounts to just a few µs so that a relatively high average current is reached during the transmit mode. In practice, this current ranges from just a few up to several hundred milliamperes for a supply voltage of e.g. 3 V during the data transmission process. These devices are therefore provided with a "powerful" battery and are only suitable for sporadic operation. Continuous operation would discharge the battery within a short time.

An optical data transmission device for a device comprising a receiver which is arranged at the location of the device and also comprises a plurality of portable transmitters which are carried by a corresponding plurality of persons is known from EP 1 229 672 B1. This data transmission device consists of a movement detector which is arranged at the location, and a plurality of optical wireless data links between the receiver and a plurality of transmitters, wherein each transmitter has a unique identification code and also means for the actuation of an alarm. The alarm is set off if there is detected by the movement detector a person at the location who does not have a transmitter having an identification code which indicates that access to the location may be granted to that person. For a 21 bit data word here, there is a transmitting time of 288 µs with a repetition rate of a minimum of two seconds. Experience shows that in the case of long data words and thus long transmitting times of this type, more energy must be made available for the transmission of the information. In addition, means for identifying the signal are necessary in the event of collision of data as a result of a signal superimposition. This can easily happen due to overlap of the temporally relatively long data words.

EP 1 804 220 A1 illustrates a method for the authorized grant of a service and portable equipment for carrying out this function without using an optical data transmission system. The communication link between the portable equipment and the medium is intended for short range operation. The portable equipment transmits one or more identifiers over several different communication links so as to gain access to the service. The employment of the short range communication link does not enable the operator to pass through a door without breaking his stride. When using the service, the operator must move towards the medium with his portable equipment.

From DE 10 2005 062 632 A1, there is known an automatic administration system for persons staying within the confines of a building wherein the access authorization is programmed into an identification element at the entrance of the building. Individual access checking devices then check this information. This is preferably effected by providing the identification elements with optically, acoustically, magnetically and/or electronically detectable, customisable identifiers. A transponder is used, above all, in the case of an electronically detectable identifier system wherein a fixed transmit/receiver device sends out a signal which induces the transponder or the corresponding transmit/receiver device of the identification element to send out a signal comprising the individualized identifier. This signal is then detected on the part of the fixed device for the purposes of controlling the entrance. If one is working with optical means, then an identifier is merely imprinted on the identification element which is then read out locally from the identification element. Hereby, optical transmission e.g. by light radiation does not take place.

BRIEF SUMMARY

Based on this state of the art, the provides a small optical transponder which has a very low power consumption.

The invention further provides an identification element incorporating an optical transponder and also by a method for recognizing an identification element.

To this end, use is made of an optical transponder, the transmitter unit of which is a light emitting transmitter unit and the receiver unit of which, if present, is a light receiving receiver unit. Furthermore, an autonomous power supply is provided, wherein the optical transponder and the autonomous power supply that is not a battery are integrated into the identification element. An optical, possibly bi-directional transponder which manages without batteries and has a substantially greater range than the known inductive transponders can thereby be achieved. Moreover, it is preferably programmable from a distance. In addition, an optical solution permits restriction of the transmission angle.

The optical transponder integrated into the identification element can thus comprise just one transmitter unit or both a transmitter unit and a receiver unit in the event of a need for greater security for example. In both cases, the transmitter unit automatically emits optical signals continuously at least periodically e.g. at a certain frequency or at a certain clock rate i.e. manual operation such as when using an e.g. remote control does not take place. Nevertheless and even despite the continual emission of the optical signals, integration into a relatively small identification element such as a name tag is possible. If the optical transponder only has one transmitter unit, then alternatively, a receiver unit which receives radio waves from its counterpart can also be provided. The transmitter unit of the optical transponder is operated by the control circuit in such a way that it emits optical pulses of less than or equal to 100 nanoseconds several times per second.

The use of short data words and transmitting times is advantageous for the transmission of information, because the shorter the data word being transmitted or the shorter the transmitting time, the smaller the amount of power that will be needed for the transmission of the data. Shorter transmission times enable interference-free conveyance of information since superimposition of the data words during transmission, when using a plurality of transponders can be prevented in this way.

The size is thus so reduced that it has the form of a conventional name tag for example. When a person approaches a door rapidly, it should open promptly enough as not to obstruct this person's passage. To this end, it is necessary for the optical transponder to have an appropriately long range. The range in the practically implemented exemplary embodiment amounted to at least 6 m. The data word of the optical transponder should also be capable of being changed optically at a certain distance, i.e. 6 m in the exemplary embodiment.

Self evidently, one can dispense with the bi-directional function when the security requirements are not so high or for other reasons. The transponder then sends out its data word e.g. 10 times per second without further functions. When the security requirements are very high, an exchange of data going beyond the functions described here can also take place between the fixed security device and the transportable optical transponder.

Further advantages are apparent from the appendant Claims and the following description of preferred exemplary embodiments.

BRIEF DESCRIPTION OF THE FIGURES

The invention is described in more detail hereinafter with the aid of the exemplary embodiments illustrated in the accompanying Figures. Therein.

DETAILED DESCRIPTION

The invention is now described by way of example in more detail with reference to the accompanying drawings. Nevertheless, the exemplary embodiments are only examples which are not intended to limit the inventive concept to a certain arrangement.

Before the invention is described in detail, it should be pointed out that it is not restricted to the particular components of the device nor to the particular method steps, since these components and processes can vary. The terms used here are merely intended to describe special embodiments and are not used in a restrictive sense. If, moreover, the singular or indefinite articles are used in the description or in the Claims, these also refer to a plurality of these elements insofar as the general context does not make it unambiguously clear that something else is meant.

Figure 1:
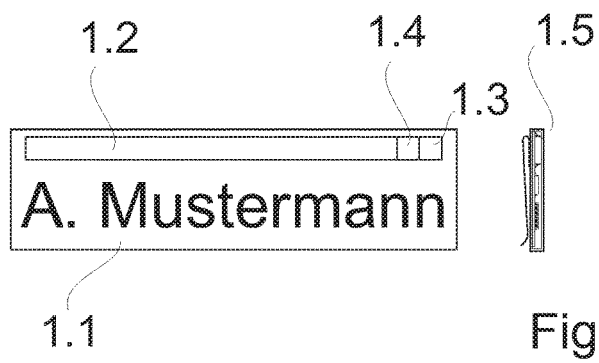
FIG. 1 shows a name tag incorporating an optical transponder.

The Figures and in particular FIG. 1 show an identification element which is preferably in the form of a name tag or an identifying means or identification element of preferably comparable size that is assigned to or is to be carried on an object or a body i.e. the identification element is generally relatively small. It can also be arranged on a vehicle e.g. in like manner to a garage door opener and then identifies the vehicle or the person within it in regard to the access authorization thereof without manual activation being necessary. It comprises an optical transponder 1.1 incorporating a data sending transmitter unit 1.3 and possibly also a data receiving receiver unit for the purposes of communicating with a device for detecting and/or controlling the right of access to areas or objects. The transmitter unit and the receiver unit which may be present in the optical transponder work in an optical manner i.e. the transmitter unit sends data in the form of a light signal and the receiver unit receives signals or data in the form of light. If the optical transponder only has a transmitter unit, then alternatively, a receiver unit which receives radio waves from its counterpart can be provided. The optical transponder and an autonomous power supply are integrated into the identification element.

Thus, the optical transponder integrated into the identification element may contain only a transmitter unit 1.3 or may have both a transmitter unit and a receiver unit 1.4 in the event of higher security needs for example. In both cases, the transmitter unit automatically emits optical signals continuously at least periodically e.g. at a certain frequency or at a certain clock rate i.e. manual operation such as e.g. with a remote control does not take place. Nevertheless and even despite the continual emission of the optical signals, integration into a relatively small identification element such as a name tag is possible.

FIG. 1 shows a name tag incorporating an optical transponder. The solar cell which serves as an autonomous power supply is accommodated in the region 1.2. In the exemplary embodiment, it comprises an arrangement of eight photodiodes, e.g. BPW 34 from the Osram company. Alternatively, the autonomous power supply could also be formed by at least one battery having a guaranteed lifetime of more than one year that is integrated into the identification element i.e. into the housing 1.1 of the name tag for example. The optical transmission element e.g. an (IR-)light emitting diode is located in 1.3. 1.4 is the photodiode for receiving the information being sent out by the fixed security device. The housing 1.1 can include any arbitrary material and only serves for accommodating the electronics. 1.5 shows a schematic side view (sectional view) including the conventional clip that is used for fastening it to clothing. The electronic circuitry which is only 1.5 mm thick is accommodated in the interior. As can be perceived, the name tag does not have to be any thicker or larger than a conventional name tag without any electronics therein.

Figure 2:
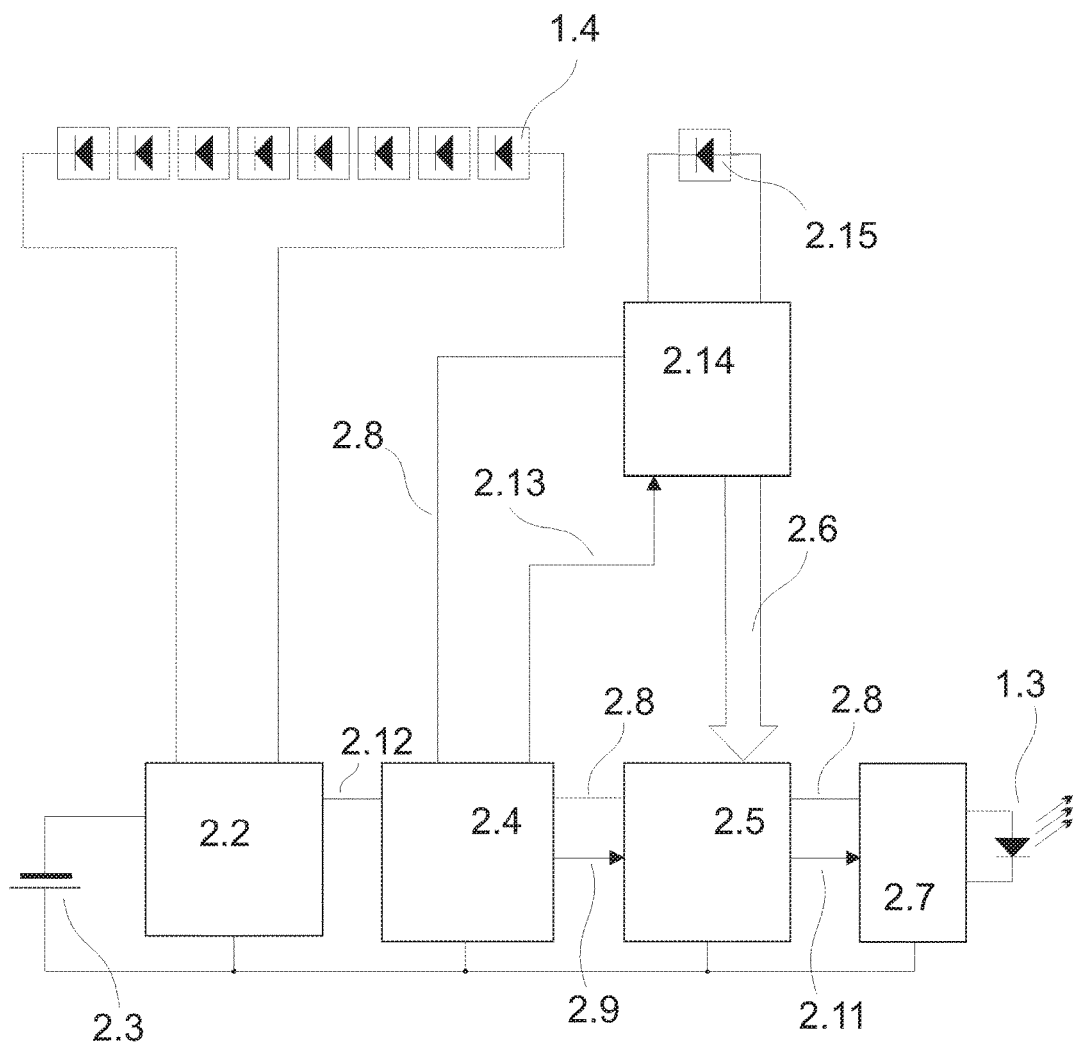
FIG. 2 the appertaining block circuit diagram of the optical transponder incorporating an optical programming function, FIG. 3 the charging circuit with preferential authorization, FIG. 4 the timing sequence of the functions in the fixed security device, FIG. 5 the timing of the functions in the optical transponder, FIG. 6 the power consumption PWR (power) of a receiver unit and a transmitter unit with a pulse width of a few milliseconds (ms) down to a few nanoseconds (ns), FIG. 7 the functioning of the fixed security device, FIG. 8 the functioning of the optical transponder, FIG. 9 the receiver and transmitter unit in the fixed security device, FIG. 10 a schematic view of a card reader with an upstream conversion module.

FIG. 2 shows the related block circuit diagram of an optical transponder in the exemplary embodiment with an optical programming function. With moderate lighting, the arrangement of the eight photodiodes in the solar cell 2.1 delivers a voltage of approx. 8×0.4 V, i.e. 3.2 V at a current of at least 100 µA. The voltage supply of the transponder amounts to 2-3 V.

In the charging circuit 2.2, the voltage delivered by the solar cell 2.1 is supplied preferentially to the clock pulse generator 2.4. Preferential treatment means that, when the secondary rechargeable battery 2.3 is discharged, one does not have to wait for the necessary voltage of e.g. at least 2.0 V to be obtained by means of a long charging period, but rather, that even in the case of a fully discharged rechargeable battery, the clock pulse generator 2.4 and the other electronics stages 2.5, 2.7 and 2.14 connected thereto are immediately supplied with the necessary voltage. The unconsumed i.e. surplus current is then supplied to the rechargeable battery 2.3. If the light on the solar cell 2.1 is poor and in the event of an at least partially charged rechargeable battery, then this battery takes over the task of supplying current to 2.4, 2.5, 2.7 and 2.14. The stage 2.5 is the data word generating stage and it contains a control circuit for the transmitter unit (optical transmission element 1.3) and the receiver unit (photodiode 1.4) and possibly also a microprocessor, preferably an FPGA (Field Programmable Gate Array). A memory unit and a programming arrangement could also be provided here.

Figure 3:
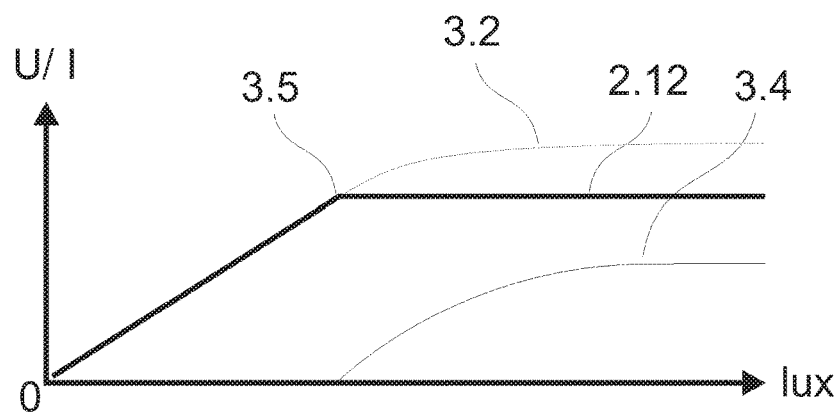

FIG. 3 explains the charging circuit with the preferential arrangement 2.2.

The curve 3.2 starts at the common zero point of the voltage supply 2.12 and the curve 3.2 itself. It shows the voltage behaviour at the solar cell 2.1 with increasing lighting without a load on the solar cell. As the lighting increases, the voltage rises until such time as the point of activation 3.5 for the charging current for the rechargeable battery 2.3 is reached. This is the necessary voltage supply 2.12 for the clock pulse generator 2.4, or the operating voltage 2.8 for the further stages of the transponder. Starting from the point of activation, this voltage of the voltage supply 2.12 is kept constant and supplied as a voltage to the transponder electronics. The further theoretical voltage increase 3.2 is converted into a charging current 3.4 for the rechargeable battery 2.3. Consequently, in failing light, a charging current is only supplied to the rechargeable battery if the transponder electronics are being supplied with the necessary operating voltage. This has the advantage that the name tag is operational immediately even after a long period of storage in the dark and also in the case of poor lighting.

When the lighting is appropriate or the rechargeable battery is charged, the voltage supply 2.12 for the clock pulse generator 2.4 is activated. The clock pulse generator 2.4 preferably contains a quartz oscillator with a downstream frequency divider. The accuracy provided by the quartz ensures that the optical data words will always be sent out with exactly the same spacing. This is of advantage for the reception of the optical data in the event of heavy interference in its environment or in the case of simultaneous bi-directional operation of a plurality of transponders. The explanation in relation thereto is provided in the description of the receiver.

The clock oscillator 2.4 activates the start for the transmission of the optical data word via 2.9. In order to save energy, the further stages for the generation of data words 2.5 and the LED driver stage 2.7 are only supplied with the operating voltage 2.8 during the sending of the data word. The data word generating system 2.5 produces the appropriate data word 2.11 and passes it to the LED driver stage 2.7 which drives the LED 1.3 with the appropriate amount of current. The data word can be fixed and predetermined by the hardware but could also be programmable. For a bi-directional exchange of data, the receiver unit 2.14 is activated after the transmission of the data word 2.11 by the clock pulse generator 2.4 via 2.13. This activation process is started some µs before the expected optical data transmission in order to complete the charging processes in the condensers involved. The length of time for which the receiver stage 2.14 is activated depends on the desired data transmission, it should however be kept short in the sense of a low average current consumption. Alternatively, a corresponding energy-saving operation can also be achieved using a receiver unit for receiving radio waves.

In the exemplary embodiment, a unique photodiode 1.4 is provided for the reception of the optical data. Self evidently, the photodiodes 2.1 could also be used for reception purposes with a suitable electronic system.

The received items of data 2.6 are supplied to the stage 2.5 and there for example, they can have an effect upon the data word 2.11 in an appropriately desired manner. To this end for example, a microprocessor, preferably an FPGA, can be provided in the stage 2.5. Preferably too, the basic programming of the optical transponder could also be effected in this way. In other words, the data from the optical transponder 1.1 in particular can be affected by a bi-directional communication with the device for detecting and/or controlling the access authorization process. After sending the data word, the optical transponder in this exemplary embodiment automatically switches itself off until the next activation by the clock oscillator 2.4.

Figure 9:
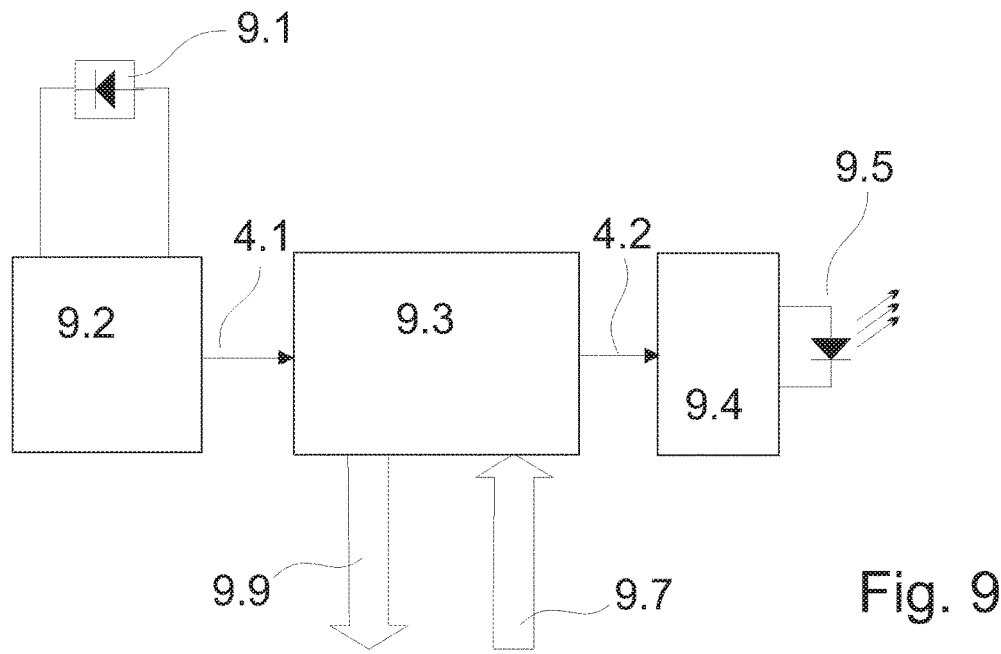

The receiver and the transmitter unit of the fixed security device are illustrated in FIG. 9. The optical signal being sent by the transponder is received by the photodiode 9.1 and the receiver's electronic system 9.2 and supplied to the data processing system 9.3. In order to suppress interference, the data processing system 9.3 can permit only that data which occurs at a precisely determined time after the detection of a valid data word. To this end, the signal received from the photodiode 9.1 and the receiver's electronic system 9.2 is firstly constantly checked for a valid data word. Once this has been found, a second data word can only occur again after an interval of time that is generated by the oscillator, preferably a quartz oscillator, in the transponder. The data processing system 9.3 has a matching time base and only accepts the data occurring in the corresponding time interval for checking purposes.

Following a validly recognized data word in the fixed security device, the transmission stage 9.4 of the fixed unit sends its own data word to the transponder using the sending element 9.5 e.g. a light emitting diode. This data word can contain e.g. programming instructions for the transponder or for the transponder data. This method is advantageous when, for example, several persons are going through a security block at the same time, and each person should have individual items of information optically "written" onto their transponder. Thus for example, it is also possible to provide the optical transponders with additional information which relates, for example, to the expired access authorization of a third person which can and should be communicated to all the access security systems in this way.

Figure 4:
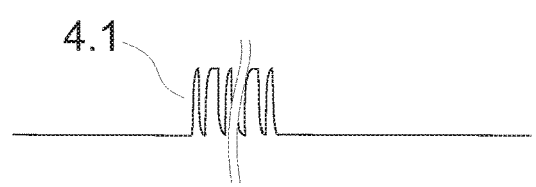
Figure 4:
Figure 4:
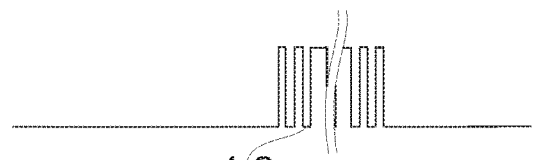

FIG. 4 shows the timing sequence for the functions in the fixed security device. The signal sent optically by the transponder in the form of the received signal 4.1 is illustrated after the reception thereof in the receiver's electronic system 9.2. After confirmation of the validity thereof in the data processing system, the passage can be enabled e.g. by virtue of the corresponding data communication 9.9 with an electrical control system for a door or with a central computer. Furthermore, following a valid data word, the transmission stage 9.4 can be activated for the time period 4.2. It then sends a corresponding data word 4.3 which, for example, is predefined by the data communication 9.7 with a central computer.

Figure 5:
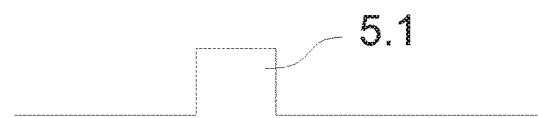
Figure 5:
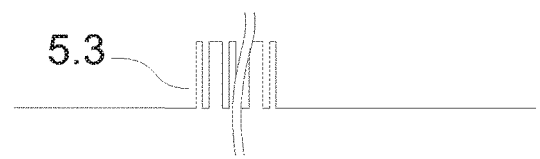
Figure 5:
Figure 5:
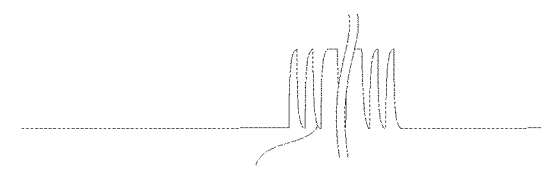

FIG. 5 shows the timing functions in the optical transponder in accordance with FIG. 2. The stage 2.5 for the production of the data word 5.3 is started in the time period 5.1 by the clock oscillator 2.4. At the end of the transmission, the transponder receiver unit 2.14 is activated via 2.13 for the time interval 5.4. The unique data word sent out by the fixed security device after reception of a valid data word is illustrated as the received signal in the transponder in the form of the curve 5.5. This received data word can now appropriately modify the e.g. original data word that was to be sent by the transponder.

The data word being sent out constantly by the transponder could also be just an "activation code" for the fixed receiver which, in turn, then sends out a special data word that causes the optical transponder to send out its actual security data word. Unauthorized "monitoring", or, in this case, optical spying of a data word can be prevented by this measure. The "activation code" for the receiver does not, for example, have to be particularly encrypted, an e.g. 8 bit code is sufficient. The actual identification process then takes place at a substantially higher data rate. Bi-directional communication offering a high degree of security when appropriately designed is thereby ensured.

Thanks to the form of operation with a an autonomous power supply that is not a battery and the aforesaid measures, the size of the identification element can be reduced in such a way that the transponder can be manufactured in the form of a conventional name tag for example. When a person is approaching a door rapidly, it should open promptly enough so as not to obstruct this person's passage. To this end, it is necessary for the optical transponder to have an appropriately long range. The range in the exemplary embodiment amounted to at least 6 m. The data word of the optical transponder should also be capable of being changed optically at a certain distance, i.e. 6 m in the exemplary embodiment.

Self evidently, one can dispense with the bi-directional function when the security requirements are not so high or for other reasons. The transponder then sends its data word e.g. 10 times per second without further functions. When the security requirements are very high, an exchange of data going beyond the functions described here can also take place between the security device and the transportable optical transponder.

Transmitter units for optical signals within the infrared range are generally known. Remote controls and in particular remote controls for TV and the like, usually work with coded infrared light. These transmitter units are activated by depressing a key and then send out coded light pulses i.e. their data word, for the short time interval during which the key is depressed or for a pre-determined time. In order to obtain a greater range, an appropriately high current is sent through the transmission elements for a short time, these elements usually being light emitting diodes. The pulse length generally amounts to just a few μs so that a relatively high average current is reached during the transmit mode. In practice, this current ranges from just a few up to several hundred milliamperes for a supply voltage of e.g. 3 V during the data transmission process. These devices are therefore provided with "powerful" batteries and are only suitable for sporadic operation. Continuous operation would discharge the battery within a short time.

A further requirement is the reaction rate. Rapid movement towards a door must be recognized sufficiently quickly as to allow the access authorization to be checked and the door to be opened in good time. This can only be ensured if the repetition rate of the optical data word is correspondingly high e.g. 10 times per second. After mutual recognition of the fixed security device and the transportable transponder has been achieved, any requisite further exchange of data can then take place substantially more frequently.

These requirements do however present a large hurdle especially in the case of an optical system which is also intended to be remotely optically programmable.

Possible Solution 1:

The optical transponder is always ready to receive. It then only sends out its data word if it receives a specially coded optical signal which has been emitted by the fixed security device, e.g. of a door.

Figure 6:
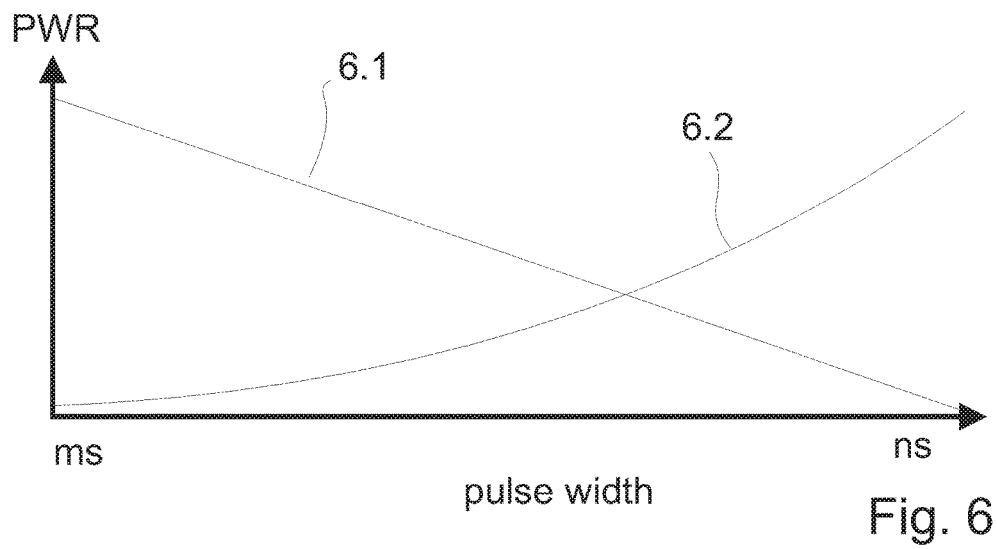

For this purpose however, one needs to consider the following: FIG. 6 schematically depicts the power consumption PWR (power) of a receiver or of a transmitter unit when using a pulse width varying between some milliseconds (ms) down to some nanoseconds (ns). The curve 6.1 shows the power consumption of the transmission stage. In the case of "long" transmission pulses within the millisecond range, this transmission stage uses more energy than it does when only sending out short signals in the nanosecond range. The receiver stage behaves in the opposite manner. Its power consumption in dependence on the pulse width that is to be received is depicted by curve 6.2. In today's state of the art, a receiver stage uses more energy when the bandwidth is increased i.e. in the case of very short pulses in the nanosecond range.

Thus, in accord with the illustration, it would be better to choose a current-saving receiving technique for a permanently operative receiver in the optical transponder. Consequently, this can be achieved if the transmitted pulses are relatively long. Since the current needed for a transmission can easily be provided in the fixed security device e.g. of a door, this concept would be one possibility for waking up the transponder when approaching the door so that it can emit its data word. A receiver stage in the transponder can then be operated with a relatively small current of e.g. 20 µA in order to receive optical pulses having a bandwidth of e.g. 2 kHz which corresponds to a pulse width within the range of just a few microseconds. After evaluation of these received optical signals i.e. the data word for the activation of the transmitter in the transponder, a data word can then be sent out by the optical transponder using "current-saving" pulses in the nanosecond range. In turn, the "rapid" receiver having a relatively high current consumption that is required for this purpose can be accommodated unproblematically in the fixed security device e.g. of the door.

Figure 7:
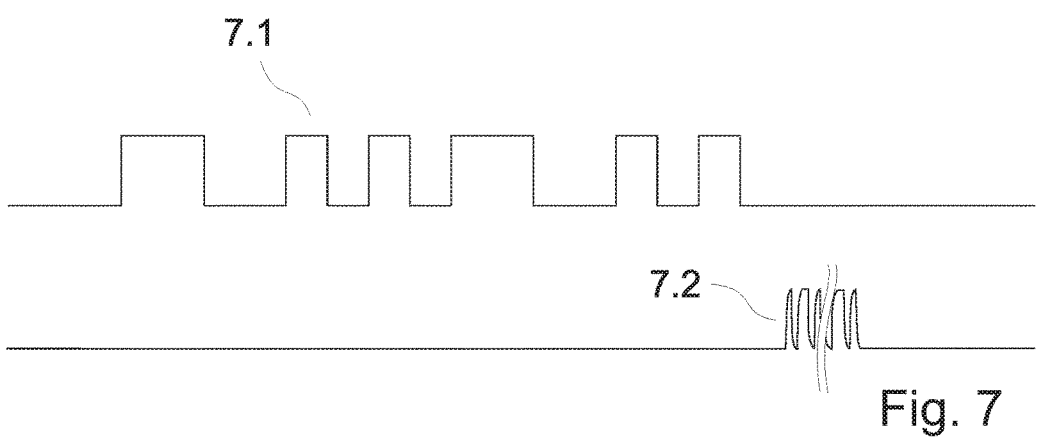
Figure 8:
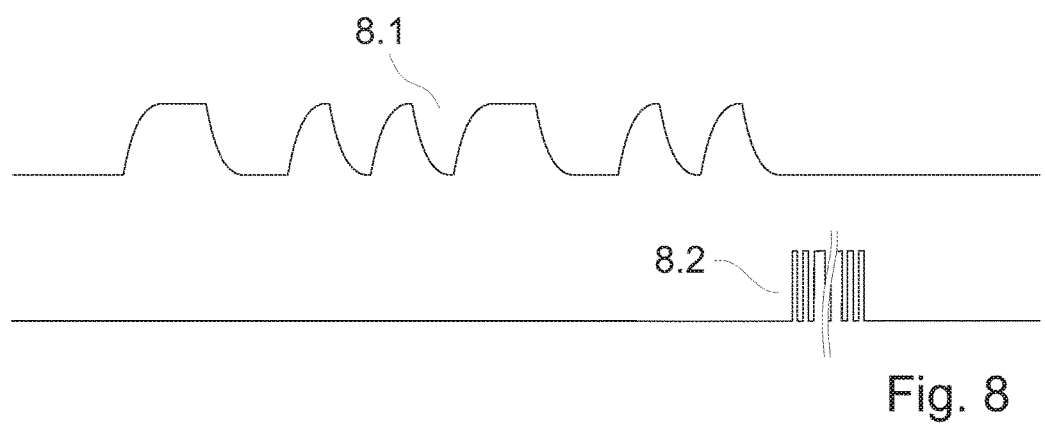

This manner of functioning is shown in FIG. 7 and FIG. 8.

FIG. 7 illustrates the manner of functioning of the fixed security device, FIG. 8 the manner of functioning of the optical transponder. The relatively "long" transmission pulses 7.1 from the fixed security device lead to a corresponding received signal 8.1 in the receiver in the transponder. This signal contains the data word for waking up the transponder, in that the data word generating/control circuit 2.5 activates the transmitter unit after the receipt of a data signal via the receiver unit. The possible low-pass effect of the receiver is illustrated by the rounding of the edges in the received signal. The opposite form of behaviour occurs when the transponder has received the signal 8.1 and now itself again sends out a data word 8.2. This is received in the fixed security device in the form of the signal 7.2 which opens an e.g. door with appropriate authorization.

However, two arguments speak against this manner of proceeding. First of all, there is significant interference due to fluorescent lamps in the low-frequency optical spectrum in which the data word 7.1 is located, particularly within the range of <50 Hz to over 500 kHz, and this would therefore make it difficult to obtain unimpaired operation of the transponder. Secondly, a receiver in the transponder must be in operation on a permanent basis. In accord with the state of the art, this entails at least 20 µA i.e. a current consumption which is too high for operation with a small battery or solar cell.

Furthermore, in many cases, the optical transponder should not only send out its own data word but it must also receive and appropriately process e.g. for programming purposes another data word which is being sent out by the security device. Bi-directional or programmable systems are in particular demand e.g. in those cases where enhanced security to counter unauthorized entry is needed.

These requirements together with the demand for as small a current consumption as possible lead to a somewhat different concept: In order to ensure these performance features, special measures are necessary if one is to dispense with battery operation.

Possible Solution 2:

This is described in more detail with the aid of the exemplary embodiment depicted in FIG. 1. In this exemplary embodiment, the transponder regularly sends out a 24 bit data word using short pulse times, followed by a receiving phase for a 24 bit data word having equally short pulse times. The transponder in accord with FIG. 1 is of the size of a commercially available name tag. The thickness thereof amounts to approx. 2.2 mm. In order to ensure very long term availability, battery operation is dispensed with. The current supply is provided by a small solar cell with a rechargeable battery. The possible surface area 1.2 for the solar cell amounts to e.g. only 50×3 mm in the exemplary embodiment.

Furthermore, it has to be ensured that the transponder can build up a reserve allowing for at least 24 hours of continuous operation in complete darkness even when the room lighting is bad or the daily available light amounts to just 3-4 hours of moderate brightness. In the case where the rechargeable battery has been completely discharged e.g. should it have lain for days in a dark cupboard, the transponder must be immediately fully functional even under minimal lighting conditions. The fact that these demands were fulfilled in the exemplary embodiment will be explained in the following arithmetical example for the exemplary embodiment:

First though, the following assumptions must be made for the purposes of estimation:

For the purposes of saving transmitting power per unit of time, the transmission of the optical information should be as short as possible. Complex optical focusing systems i.e. lenses or concave mirrors for reception purposes are avoided for reasons of cost. A useable detection sensitivity at low cost can be achieved by the employment of an inexpensive photodiode e.g. a BPW 34 by Osram. The upper limiting frequency of such a photodiode with a tenable outlay on the electronics system lies at approx. 25 MHz. This corresponds to a pulse width of 20 nanoseconds which can still be detected with ease. If we now assume a data transmission system wherein a "0" is transmitted by an optical pulse having a width of 20 ns and a "1" using double the time i.e. 40 ns whereby each second data word is a mirror image (0 becomes 1, 1 becomes 0), one can reckon on a fixed average pulse length of 30 ns. Self evidently, any other suitable method of coding can be used, the only important thing being that the data word can be transmitted in a very short transmitting time, e.g. under 1 µs. The short transmitting time has yet another advantage: the spectral components lie in a frequency range above e.g. 10 MHz, i.e. beyond the optical interference spectrum which can generally be expected.

An alternative to the abovementioned method of coding a data word, is a system wherein the signals for "0" and "1" are transmitted in the same way but with differing subsequent pause lengths which serve as distinguishing features. The advantage of this variant is the unchanging, energy-saving consumption during the data transmission process. The transmission times of the optical pulses are less than 100 ns, preferably 20 ns to 50 ns. If one assumes that the signal for the "0" and for the "1" is transmitted with an optical pulse width of 20 ns and there is a break of 30 ns following the "0", a double pause length of 60 ns is associated with the "1".

Let us assume in the first method of coding that a 24 bit data word is transmitted 10 times per second. The total transmitting time per second for this data word then amounts to 24×30 ns×10, i.e. 7.2 µs per second. Converted to one hour, this then results in a transmission length of 25.92 milliseconds.

A solar cell, comprising the exemplary embodiment of eight series connected photodiodes (FIG. 2, 2.1) of the type BPW 34, produces approximately 100 µA with a voltage under load of approx. 3.0 V in moderate lighting conditions. The supply voltage (2.8) of the transponder is 2-3 V. If one assumes daily lighting in the worst case of 4 hours, this gives a total value of current per day of 400 µA. Converted into one hour, this corresponds to an average current of 16.6 µA. A very small rechargeable battery or an appropriate condenser (2.3) is provided for the purposes of storing the quantity of energy occurring in these 4 hours. The efficiency of the storage medium is dependent on the technology being used, but it can however fall to 70% so that of the calculated 16.6 µA/hr yet 12 µA/hr will be available in the worst case.

A clock pulse generator 2.4 operating at the frequency of 10 Hz stimulates the data transmission process. One can reckon on a continuous 0.25 µA for this purpose. The optical data transmission is thus activated 10 times per second and in each case sends out a complete data word. At the end of each data transmission, the electronic system provided for this purpose switches itself into a current-free state until next activated.

For the purposes of generating the data word every 100 ms, the transmission stage 2.7 is activated for 1.5 µs on each occasion. The longer length of time vis a vis the pure transmitting time for the emitted light data results from the average 50% pulse-break ratio. The current consumption of the transmitter's electronics system—without the current through the LED—is relatively high because of the necessarily fast components, it was 25 mA in the exemplary embodiment. Overall one can thus reckon on a time of 54 ms per hour so that the average current for the transmitter's electronics system—without the current through the LED—amounts to 0.375 µA.

The receiver stage 2.14 is activated after the data transmission process. It is intended to be capable of receiving a 24 bit data word. The length of time for the actual receiving process then amounts to 60 ns per bit in the case of a 24 bit word having an average length of 30 ns since one must reckon on double the time of the pure transmission in the case of a pulse-break ratio of 50%. Accordingly, the receiving time per data word amounts to 1.44 µs. After the receiver stage is switched on, it is not immediately ready to receive because of the charging processes in the electrical capacitances. Consequently, the receiver stage 2.14 is activated 0.5 µs sooner thereby resulting in a total receiving time of approx. 2 µs per data word. On conversion into one hour, this thus results in a total time of 72 ms. The current consumption of the receiver unit was about 18 mA in the exemplary embodiment. Thus, converted to the 72 ms, a current of 0.36 µA is needed for the reception of 10×24 bit/sec. Additionally, in the worst case, a residual current, which cannot be eliminated, through the non-disconnectible electronic components of 0.4 µA must also be taken into consideration. The electronic charging system 2.2 incorporating the preferential authorization feature for the operation of the transponder uses 0.55 µA on a continuous basis.

Together, this results in an average current consumption for the electronics:

| Clock pulse generator: | 0.25 µA |
|---|---|
| Transmitter electronics: | 0.375 µA |
| Receiver electronics: | 0.36 µA |
| Charging system electronics: | 0.55 µA |
| Residual current: | 0.4 µA |
| | =1.935 µA |

If one takes this current away from the available 12 µA, then approx. 10 µA remains for powering the purely optical transmission process. 10 µA/hr converted to 25.92 ms pure transmission time per hour, then results in a pulsating current of at least 1.388 ampere through the light emitting diode. This power is sufficient to achieve a range of several meters with an output beam angle of +/−45 degrees for the optical transmission of the data. Hereby, a conventional small IR LED 1.3 will serve for the transmitter without any further optical system.

When using a photodiode having a surface area of e.g. 8 mm$^2$ (BPW 34 or the like), an optical system can also be dispensed with for the photodiode in the fixed security device due to the high optical performance of the transmitter in the transponder. It is however self evident that, in accordance with the particular transmission or detection range required, it is possible for the range to be increased or the requirements to be reduced at any time by means of the choice of suitable optical components, for example, by using an integrated or preceding lens structure.

In practice, by virtue of these measures, an optically programmable optical transponder having an average current consumption of only 12 µA with an operating voltage of 2-3 V and a range of 6 m can be provided.

Figure 10:
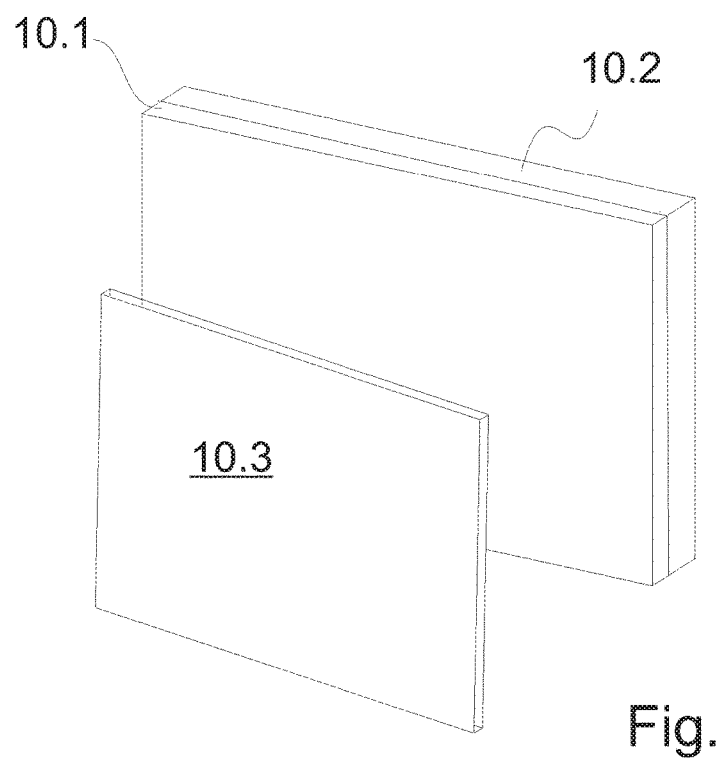

In accordance with FIG. 10, the optical transponder 1.1 can also be used for employment in known systems which do not work optically. To this end, a conversion module 10.1 which is suitable for the communication process with the identification element is provided at the device for detecting and/or controlling the access authorization process such as a card reader 10.2 for example. Therein, the data that has been transmitted optically by the optical transponder 1.1 is converted into items of data which are readable by a standard access control means and/or the data being sent out by a standard access control means is converted into optical data which is transmissible to the optical transponder. Consequently, the system can be coupled in expedient manner to known systems. At the same time furthermore, known identification elements such as magnetic cards 10.3 can also be used and furthermore detected in parallel by the conversion module 10.1.

When updating an existing RFID set-up, a user, for example when changing over from his existing magnetic card to an optical transponder, carries the optical transponder which still has no allocation in the RFID arrangement. In order to identify the optical transponder element for example, the user uses his magnetic RFID card (magnetic card 10.3) in the usual manner at an entrance door already having an RFID system and the additional device for the optical transponder reading device in the form of the conversion module 10.1. The additional device in the optical transponder reading device reads the ID number of the optical transponder name tag 1.1 and enters this ID number into a list together with the ID number read by the magnetic RFID system. When passing through the door for a second time, the ID number of the optical transponder is read and the associated RFID number is extracted from the corresponding list and conveyed to the RFID card reader 10.2. This can be done by magnetic induction or by using the interface between the RFID card reader and the central control unit. By using this process, complex adaptation of the existing system-specific infrastructure and also programming of the optical transponder are avoided.

It is self-evident that this description can be subjected to the most diverse of modifications, changes and adaptations which fall within the scope of equivalents to the appended Claims.

The invention claimed is:

1. An identification element having a transponder incorporating a data sending transmitter unit for communication with a device for at least one of detecting or controlling access authorization to areas or objects, and a control circuit for the data sending transmitter unit,
   wherein the transponder is an optical transponder and the data sending transmitter unit thereof is a light emitting transmitter unit which automatically sends out optical signals continuously at least periodically,
   wherein an autonomous power supply is provided which is not a secondary rechargeable battery of the identification element, wherein the optical transponder and the autonomous power supply are integrated into the identification element, and
   wherein the identification element is in the form of a name tag or the identification element of comparable size which is associated with or is to be carried on an object or a body,
   wherein the data sending transmitter unit of the optical transponder is operated by the control circuit in such a manner that the data sending transmitter unit sends out the optical pulses of less than or equal to 100 nanoseconds several times per second, wherein the said optical pulses define at least one data word and are generated without using power from the secondary rechargeable battery via a clock pulse generator that receives power from the autonomous power supply to continuously send out the optical signals at a frequency above approximately 10 megahertz (MHz),
   wherein at least one single optical signal among the optical signals includes the optical pulses corresponding to for a data word "0" and corresponding to a data word "1", the optical pulses corresponding to the data word "0" have a signal length and the optical pulses corresponding to the data word "1" have a signal length, which is different than the signal length of the optical pulses corresponding to the data word "0", and are distinguished by a subsequent break, and wherein the subsequent break after the data word "0" and the subsequent break after the data word "1" have differing subsequent break lengths as distinguishing features,
   wherein a number of the optical pulses corresponding to each data word "0" is greater than a number of the pulses corresponding to each data word "1".

2. The identification element in accordance with claim 1, wherein a receiver unit is provided which is receiving data via light and which is controlled by the control circuit, and wherein at least one solar cell forms the autonomous power supply.

3. The identification element in accordance with claim 2, wherein a charging circuit for charging the secondary rechargeable battery is associated with the at least one solar cell, said charging circuit supplying energy preferentially to the data sending transmitter unit when the secondary rechargeable battery is flat prior to supplying energy for charging the secondary rechargeable battery.

4. The identification element in accordance with claim 2, wherein the control circuit controls the receiver unit in such a way that it is switched to be active for a time period after the data sending transmitter unit sending of optical signals.

5. The identification element in accordance with claim 1, wherein the optical transponder comprises a memory unit and a programming device.

6. The identification element in accordance with claim 5, wherein the memory unit is influenced by the programming device as a consequence of data received by a receiver unit provided at the identification element and receiving data via light.

7. The identification element in accordance with claim 1, wherein data in the optical transponder is influenced by bi-directional communication with the device for at least one of detecting or controlling the access authorization.

8. The identification element in accordance with claim 7, wherein the data in the optical transponder is changed by the control circuit as a consequence of the data received by a receiver unit.

9. The identification element in accordance with claim 1, wherein the subsequent break following the data word "0" is short in relation to the subsequent break after the data word "1".

10. The identification element in accordance with claim 9, wherein the signal length of the data word "0" and the signal length of the data word "1" amount to between 20 ns and 50 ns.

11. The identification element in accordance with claim 9, wherein the subsequent break after the data word "0" amounts to 30 ns and the subsequent break after the data word "1" amounts to 60 ns.

12. An identification element having a transponder incorporating a data sending transmitter unit for communication with a device for at least one of detecting or controlling access authorization to areas or objects, and a control circuit for the data sending transmitter unit,
   wherein the transponder is an optical transponder and the data sending transmitter unit thereof is a light emitting transmitter unit which automatically sends out optical signals continuously at least periodically,
   wherein data in the optical transponder is influenced by bi-directional communication with the device for at least one of detecting or controlling the access authorization,
   wherein an autonomous power supply is provided which is not a secondary rechargeable battery of the identification element, wherein the optical transponder and the autonomous power supply are integrated into the identification element, and wherein the identification element is in the form of a name tag or the identification element of comparable size which is associated with or is to be carried on an object or a body, wherein the data sending transmitter unit of the optical transponder is operated by the control circuit in such a manner that the data sending transmitter unit sends out the optical pulses of less than or equal to 100 nanoseconds several times per second, wherein the said optical pulses define at least one data word and are generated without using power from the secondary rechargeable battery via a clock pulse generator that receives power from the autonomous power supply to continuously send out the optical signals at a frequency above approximately 10 megahertz (MHz), wherein at least one single optical signal among the optical signals includes the optical pulses corresponding to a data word "0" and corresponding to a data word "1", the optical pulses corresponding to each data word "0" have a signal length, and the pulses corresponding to the data word "1" have a signal length, which is different than the signal length of the optical pulses corresponding to the data word "0", and are distinguished by a subsequent break, wherein the subsequent break after the data word "0" and the subsequent break after the data word "1" have differing subsequent break lengths as distinguishing features, wherein a number of the optical pulses corresponding to each data word "0" is greater than a number of the pulses corresponding to each data word "1".

* * * * *